(12) United States Patent
Li et al.

(10) Patent No.: US 7,696,272 B2
(45) Date of Patent: Apr. 13, 2010

(54) RUBBER TOUGHING OF THERMALPLASTIC CLAY NANOCOMPOSITES

(75) Inventors: Yunjun Li, Austin, TX (US); Dongsheng Mao, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 0 days.

(21) Appl. No.: 11/764,718

(22) Filed: Jun. 18, 2007

(65) Prior Publication Data
US 2008/0108783 A1 May 8, 2008

Related U.S. Application Data

(60) Provisional application No. 60/819,338, filed on Jul. 7, 2006.

(51) Int. Cl.
*C08K 9/04* (2006.01)
(52) U.S. Cl. .................. 524/445; 524/538; 524/607; 528/310; 528/312
(58) Field of Classification Search .............. 524/445, 524/495, 446, 447, 538, 607; 428/461, 474.4, 428/475.5, 561; 525/66, 183, 184; 528/310, 528/312
See application file for complete search history.

(56) References Cited

U.S. PATENT DOCUMENTS

| | | | |
|---|---|---|---|
| 4,739,007 A | | 4/1988 | Okada et al. |
| 5,091,462 A | | 2/1992 | Fukui et al. |
| 6,423,768 B1 | * | 7/2002 | Khouri ................... 524/445 |
| 6,472,460 B1 | * | 10/2002 | Okamoto et al. ........... 524/445 |
| 6,861,462 B2 | * | 3/2005 | Parker et al. ............. 524/445 |
| 2004/0225066 A1 | | 11/2004 | Flat et al. |
| 2006/0211804 A1 | * | 9/2006 | Kim et al. ................ 524/445 |
| 2008/0021138 A1 | * | 1/2008 | Liang et al. ............... 524/265 |
| 2008/0033092 A1 | * | 2/2008 | Santos et al. ............. 524/445 |

FOREIGN PATENT DOCUMENTS

EP    1312647 A    5/2003

OTHER PUBLICATIONS

O'Connel et al, "Yield and Crazing in Polymers", 2004, Encyclopedia of Polymer Science and Technology: Wiley Interscience: http://mrw.interscience.wiley.com/emrw/9780471440260/epst/article/pst463/current/html?hd=All,polyethylene&hd=All,semi-crystalline.*
Oshinski, A.J. et al.; The Role of Matrix Molecular Weight in Rubber Toughened Nylon 6 Blends: 3. Ductile-Brittle Transition Temperature; *Polymer*; vol. 37, No. 22, pp. 4919-4928, Aug. 21, 1995.

(Continued)

*Primary Examiner*—Ling-Siu Choi
*Assistant Examiner*—Frances Tischler
(74) *Attorney, Agent, or Firm*—Kelly Kordzik

(57) ABSTRACT

Very low loading of impact modifier less than 4% can significantly improve elongation and impact strength of N6/clay nanocomposites and keep the high tensile strength and modulus. This rubber modified nylon nanocomposites have potential applications in fabricating high-strength fibers for textile industry, coatings for strings or polymer parts, and packaging industry.

9 Claims, 1 Drawing Sheet

OTHER PUBLICATIONS

Laura, D.M. et al.; Effect of Rubber Particle Size and Rubber Type on the Mechanical Properties of Glass Fiber Reinforced Rubber-Toughened Nylon 6; *Polymer*; vol. 44, pp. 3347-3361, May 1, 2002.

Data Sheet Exxelor Maleic Anhydride Functionalized EP VA 1801 (Exxon Mobil Corporation; 2008; 2 pages).

Data Sheet Exxelor Maleic Anhydride Functionalized EP VA 1840 (Exxon Mobil Corporation; May 2003; 2 pages).

Ahn et al. "Rubber toughening of nylon 6 nanocomposites," Polymer, Elsevier Science Publishers B.V., GB, vol. 47, No. 8, Apr. 5, 2006, pp. 2830-2838.

Work et al. Definition of terms related to polymer blends, composites, and multiphase polymeric materials (IUPAC Recommendations 2004), Pure Appl. Chem., vol. 76, No. 11, pp. 1985-2007.

International Search Report for PCT/IB2007/003725 mailed Aug. 11, 2008, 17 pages.

* cited by examiner

RUBBER TOUGHING OF THERMALPLASTIC CLAY NANOCOMPOSITES

This application for patent claims priority to U.S. Provisional Patent Application Ser. No. 60/819,338, which is hereby incorporated by reference herein.

TECHNICAL FIELD

The present disclosure is related to nanocomposites, and in particular, to nylon nanocomposites.

BACKGROUND INFORMATION

Reinforcing polymeric composites using nano-sized particles with high aspect ratio have been investigated since the 1980's (see, U.S. Pat. No. 4,739,007). Polymer/layered-silicate nanocomposites have extensively been investigated due to the significant improvements in the mechanical strength and stiffness, enhanced gas permeability barrier, good thermal resistance, and flame retardancy. Polymer nanocomposites normally require a low loading concentration of inexpensive silicate clays such as montmorillonite (MMT), vermiculite, saponite, and hectorite. Well-exfoliated nanocomposites can be produced by in situ polymerization and melt-compounding techniques. Nanocomposites have been prepared by a melting process from a wide variety of polymers. U.S. Pat. No. 4,739,007 disclosed a method to produce nylon 6 organoclay nanocomposites using in-situ polymerization to produce highly reinforced nylon composites, achieving high flexural modulus, tensile strength and heat distortion. On the other hand, these nylon-based nanocomposites become non-ductile. Typically, impact modifiers are added, to improve impact toughness at the expense of flexural modulus. What is desired commercially is an approach for toughening these nylon/organoclay composites to obtain high impact strength while retaining high modulus and strength. Besides, to make high-performance nanocomposite fibers and coating for elastic strings, the improvement in elongation is also important for clay nanocomposites. Some groups have reported improving elongation of clay-based nylon nanocomposites by using a rubber impact modifier while maintaining a relatively high modulus and strength, but none of them achieved a good elongation at break which is comparable to that of pristine nylon (see, A. J. Oshinsko, H. Keskkula, and D. R. Paul, Polymer, 37, 4891, (1996); Young-Cheol Ahn, D. R. Paul, Polymer, 47, 2830 (2006)). Most, reports showed that relatively high rubber loadings over 5% were used to toughen nanocomposites with a high impact strength, leading to even lower modulus and strength than neat polymer, however.

DETAILED DESCRIPTION

Figure 1:
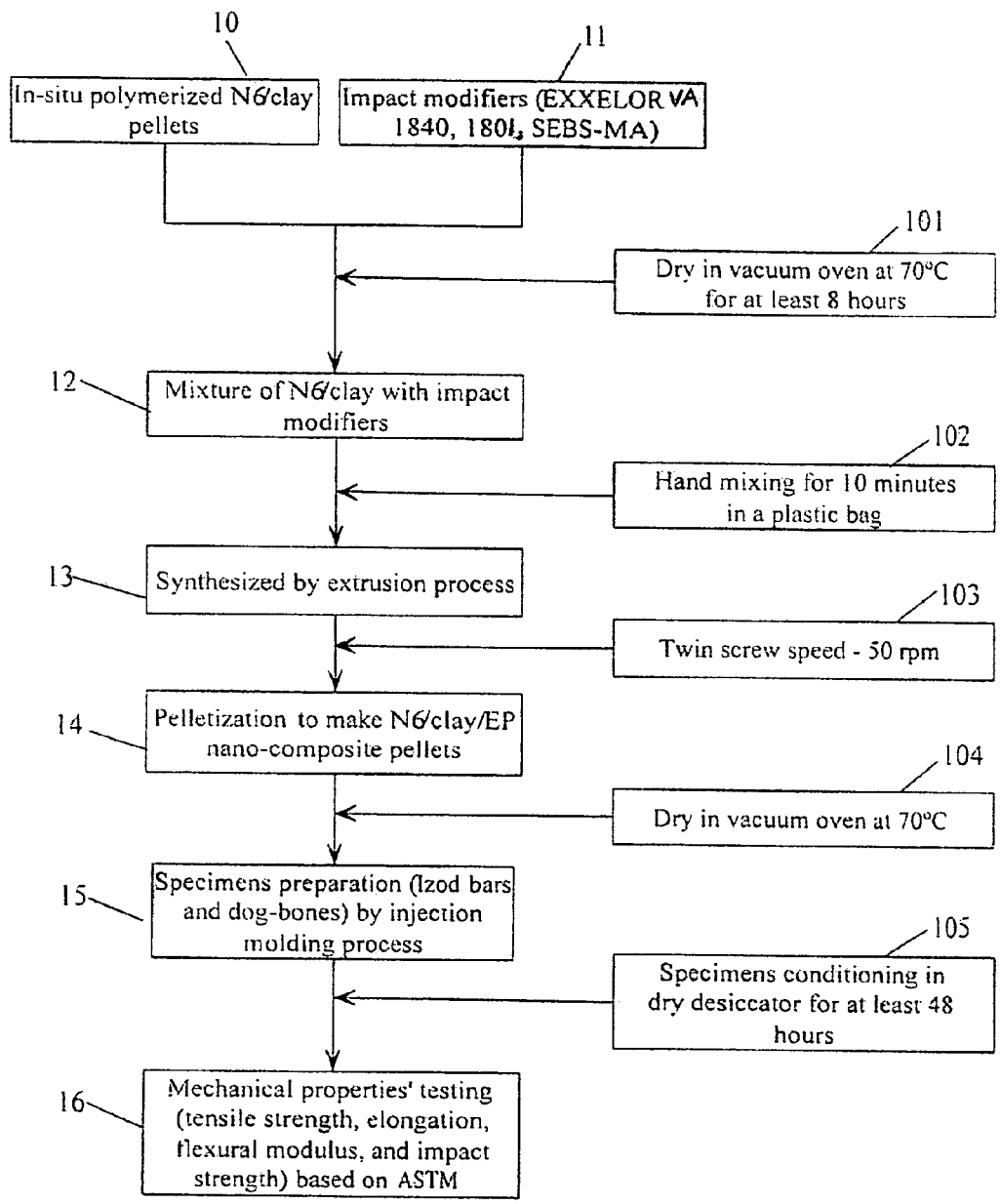
FIG. 1 illustrates a flow diagram configured in accordance with embodiments of the present invention.

To toughen polymer nanocomposites, such as nylon/clay nanocomposites, the nanocomposites are generally melt-compounded with a maleated elastomer wherein the grafted maleic anhydride readily reacts with the amine end groups of polyamide to form a graft copolymer that strengthens the interface between the two phases and controls the morphology. Elastomer particle size is a key parameter in achieving good toughness of polyamides. Many types of impact modifiers are currently available in the market place. For nylon nanocomposites, maleated or non-maleated styrene-hydrogenated butadiene-styrene triblock copolymers (MA-SEBS or SEBS), ethylene propylene random copolymer (EPR or EPR-g-MA), ethylene-glycidyl methacrylate copolymer (PE-GMA), etc. have been employed to enhance the physical properties of nylon nanocomposites. To improve the properties of nanocomposites by using impact modifier, the type of impact modifier and melt-compounding process must be carefully chosen.

In embodiments of the present invention, SEBS/SEBS-MA and ethylene propylene copolymers with various morphologies are used to improve the physical properties of nylon nanocomposites. Instead of employing melt-compounded nylon nanocomposites, the nylon nanocomposites made from an in-situ polymerization method, which is known to achieve the best exfoliation and the best tensile strength, are melt-compounded with different impact modifiers. It is found that semi-crystalline ethylene propylene random copolymer with medium maleic anhydride content is melt-compounded with the exfoliated clay-based nanocomposite to significantly improve elongation of N6/clay nanocomposites at a very low loading of impact modifier less than 4%. However, similar results were not achieved from other groups, although some groups reported elongation can be improved to near 90%. But, the loadings of impact modifier are normally higher than 4%. The semi-crystalline EP impact modifier melt-compounded with exfoliated clay-N6 nanocomposites can produce nano-sized clusters of impact modifier uniformly dispersed in N6-clay matrix. The exfoliated clay platelets do not penetrate into the rubber phase so that more elongated EP particles are produced in clay-N6 matrix, resulting in very effective toughening to clay-N6 nanocomposites.

A lot of applications may be found for this modified nylon nanocomposites if the nanocomposites not only keep high tensile strength and modulus, but have a high elongation, such as making high-strength fibers, packaging, etc.

FIG. 1 illustrates a flow diagram of a process to make N6 nanocomposites. Nylon 6 nanocomposites 10 and rubber impact modifiers 11 are dried 101 separately in an oven at 70° C. for at least 8 hours. 4% clay nylon 6 composites 10 made by in-situ polymerization are melt-compounded with impact modifiers 11 of EXXELOR VA 1840, EXXELOR VA 1801, and SEBS/SEBS-MA, to improve impact strength and elongation. The difference between EXXELOR VA 1840 and EXXELOR VA 1801 is that EXXELOR VA 1840 (Exxelor is a brand name from ExxonMobil Chemical) has medium maleic anhydride content in a range of 0.2 to 0.5 wt %, and EXXELOR VA 1801 has a high maleic anhydride content in a range of 0.5 to 1.0 wt %. The mixture of SEBS and SEBS-MA is also used to melt-compound with 4% clay nylon 6 nanocomposites. In step 102, to mix the pellets of in-situ N6/clay nanocomposite and impact modifier evenly, the two types of pellets are put into a bottle or a plastic bag. Shake and rotate the bottle or the bag to make the impact modifier pellets evenly distributed in the mixture. A HAAKE Rheomex CTW 100 twin screw extruder is used to blend nylon/clay nanocomposites with impact modifiers 13. Following are the parameters used in this process:

Screw zone 1 temperature—240° C.;
Screw zone 2 temperature—230° C.;
Screw zone 3 temperature—230° C.;
Die temperature—240° C.;
Screw speed 103—50 (maximum speed designed for this extruder is 200 rpm).

The nanocomposite fiber is quenched in water and pelletized 14 using a Haake PP1 Pelletizer POSTEX after extrusion process. The nanocomposite pellets are dried 104 at 70° C. prior to the injection molding process 15 to make specimens of dog-bones for tensile tests and Izod bars for modulus and impact tests.

Following are the parameters used:
Injection pressure—70 bar;
Holding pressure—35 bar;
Holding time—20 seconds:
Heating zone 1 temperature—245° C.;
Heating zone 2 temperature—250° C.;
Heating zone 3 temperature—255° C.;
Nozzle temperature—260° C.;
Mold temperature—60-80° C.

The specimens after injection molding are kept in dry desiccators 105 or in vacuum and ready for tests. The molded samples with specific dimensions follow ASTM-standards 16 (ASTM D62B for tensile strength testing, ASTM D256 for impact strength testing, ASTM D790 for flexural modulus testing).

To choose proper impact modifier for the highest impact strength, nylon 6 nanocomposites with 4% clay loading are melt compounded with different rubber impact modifiers at a loading of 20%, 10%, and 5%, respectively. Table I shows the results.

TABLE I

Properties of N6 nanocomposites from different impact modifiers.

| Impact modifier | % Clay | % impact modifier | Tensile Strength (MPa) | Elongation Break (%) | Flexural Modulus (GPa) | Impact Strength (Kgfcm/cm) |
|---|---|---|---|---|---|---|
| EXXELOR VA 1840 | 4 | 20 | 49 | 50 | 2.44 | 561 |
| EXXELOR VA 1801 | 4 | 20 | 43 | 20 | 2.2 | 470 |
| EXXELOR VA 1840 | 4 | 10 | 70 | 24 | 3.2 | 18.9 |
| EXXELOR VA 1840 | 4 | 5 | 79 | 30 | 3.16 | 11.2 |
| SEBS-MA | 4 | 20 | 52 | 18 | 2.27 | 330 |
| SEBS-MA | 4 | 5 | 63 | 4/Brittle | 3.4 | 5.8 |

EXXELOR VA 1840 of ethylene propylene copolymer with medium maleic anhydride content has the best performance in terms of impact strength and elongation. SEBS-MA has the worst effect on nanocomposites for blended nanocomposites. Table II shows that the mixture of 80% SEBS and 20% SEBS-MA has a better performance than SEBS-MA or SEBS only, indicating that the proper MA content is required to toughen nanocomposites.

TABLE II

Properties of N6 nanocomposites from SEBS & Maleic Anhydride grafted SEBS(SEBS-MA) Impact modifier.

| Impact modifier | % Clay | % impact modifier | Tensile Strength (MPa) | Elongation Break (%) | Flexural Modulus (GPa) | Impact Strength (Kgfcm/cm) |
|---|---|---|---|---|---|---|
| 20% SEBS-MA + 80% SEBS | 4 | 4 | 87.2 | 37 | 3.86 | 8.2 |
| SEBS | 4 | 4 | 80 | 6 | 3.67 | 7.6 |
| No | 4 | 0 | 94 | 4.1 | 5 | 6 |

As indicated in Table III, by adding 3% EXXELOR VA 1840 achieved was a tensile strength of 93 MPa while retaining the elongation over 100% and modulus over 4 GPa, although impact strength still needs to be improved to the level of pristine nylon 6.

TABLE III

Properties of N6 nanocomposites from EXXELOR VA 1840.

| Impact modifier | % Clay (Starting content) | % impact modifier | Tensile Strength (MPa) | Elongation Break (%) | Flexural Modulus (GPa) | Impact Strength (Kgfcm/cm) |
|---|---|---|---|---|---|---|
| EXXELOR VA 1840 | 4 | 1.5 | 93 | 145 | 4.1 | 7.9 |

TABLE III-continued

Properties of N6 nanocomposites from EXXELOR VA 1840.

| Impact modifier | % Clay (Starting content) | % impact modifier | Tensile Strength (MPa) | Elongation Break (%) | Flexural Modulus (GPa) | Impact Strength (Kgfcm/cm) |
|---|---|---|---|---|---|---|
| EXXELOR VA 1840 | 4 | 2 | 89.7 | 170 | 4.02 | 7.2 |
| EXXELOR VA 1840 | 4 | 3 | 93.3 | 139 | 4.0 | 8.2 |
| EXXELOR VA 1840 | 4 | 4 | 87.7 | 161 | 3.9 | 10.3 |
| No modifier | 4 | 0 | 94 | 4 | 4.2 | 6 |

However, 4% rubber loading shows a better impact strength than neat nylon 6. Important is that a very low loading of impact modifier only decreases the tensile strength and modulus a little comparing clay nylon 6 nanocomposites, but tremendously improves the elongation at beak. This property may lead to a high performance fiber for the textile industry because without impact modifier it is impossible to directly fabricate fibers by using brittle nylon nanocomposites. Another important application is using the modified nylon nanocomposites as coating materials for strings to improve wear-resistance and durability of polymer strings. To make nylon packaging materials stronger and have better enhanced gas permeability barrier, the elongation is also required if nylon nanocomposites would be applied. These applications will benefit from the rubber modified nanocomposites with very low loading of impact modifier less than 4%.

2% and 3% 1840 impact modifier, however, show some unexpected results. The reason, is due to the extrusion process and blending quality of N6 and impact modifier pellets because the pellet size is so big so that the difference between 2% and 3% may not be so much different if mixing is not very even. Tuning the extrusion process and getting better mixing may allow for better control of the melt-compounding process.

The invention claimed is:

1. A method comprising combining nylon nanocomposites with ethylene propylene copolymers to form a modified nanocomposite, wherein the ethylene propylene copolymers comprise semi-crystalline ethylene propylene random copolymers with medium maleic anhydride content, wherein the modified nanocomposite comprises less than 4 wt % of the ethylene propylene copolymers and has an elongation at break of at least 100% and a flexural modulus of at least 4.0 GPa.

2. The method as recited in claim 1, further comprising making the nylon nanocomposites from an in-situ polymerization process.

3. The method as recited in claim 2, wherein the nylon nanocomposites comprise nylon 6.

4. The method as recited in claim 3, wherein the nylon nanocomposites comprise clay.

5. The method as recited in claim 1, wherein the combining comprises a melt compounding process.

6. The method as recited in claim 1, wherein the maleic anhydride content is in a range of 0.2 wt % to 0.5 wt %.

7. A composite comprising nylon nanocomposites and impact modifiers, wherein the composite comprises less than 4 wt % of the impact modifiers and has an elongation at break of at least 100% and a flexural modulus of at least 4.0 GPa, and wherein the impact modifiers comprise semi-crystalline ethylene propylene random copolymers with medium maleic anhydride content.

8. The composite as recited in claim 7, wherein the maleic anhydride content is in a range of 0.2 wt % to 0.5 wt %.

9. The composite as recited in claim 7, wherein the nylon nanocomposites comprise nylon 6.

* * * * *